BINARY DATA DETECTION SYSTEM

Filed Jan. 12, 1967 3 Sheets-Sheet 1

INVENTORS
LOUIS E. AMBRICO
BENJAMIN C. FIORINO
BY Owen L. Lamb
AGENT 3,506,923

BINARY DATA DETECTION SYSTEM

Louis E. Ambrico, Hyde Park, N.Y., and Benjamin C. Fiorino, Longmont, Colo., assignors to International Business Machines Corporation, Armonk, N.Y., a corporation of New York Filed Jan. 12, 1967, Ser. No. 608,785
Int. Cl. H03k *13/00*
U.S. Cl. 329—104 14 Claims

ABSTRACT OF THE DISCLOSURE

A circuit for detecting phase encoded binary data. The input to the circuit is limited binary data. Pulses are derived from the zero crossings of this data. The positive excursions of data are integrated by a positive integration circuit and negative excursions are integrated by a negative integration circuit. The positive integrator feeds the set side of a binary trigger to turn it on when the integration exceeds a certain level. The negative integrator feeds the off side of this trigger and resets the trigger when the level exceeds a certain level. The trigger output is then used as a time gate to gate ones data to a utilization device.

Cross-references to related applications

U.S. Patent 3,401,346 "Binary Data Detection System" employing phase modulation techniques by P. J. Brown and E. G. McDonald, Jr., filed Dec. 28, 1965, and issued Sept. 10, 1968, discloses a binary data detection system in which a frequency controlled time gate gates only the data transitions of the phase encoded signal. The frequency of the time gate is controlled by generating a reference voltage, the level of which varies with the frequency of the recorded data. The time at which the frequency gate is turned on is determined by the magnitude of the frequency varying reference voltage. The frequency controlled time gate is always turned off with a data transition.

BACKGROUND OF THE INVENTION

(1) Field of the invention

The invention relates to binary data detection systems and more particularly to such systems in which the binary information is recorded in the form of signals which experience at least one change in polarity for each data bit.

(2) Description of the prior art

In systems employing phase-modulation techniques each binary bit cell experiences a change in polarity at the center of the bit cell. The direction of the polarity change represents the binary value of the information. For example, a binary 1 may be represented by a change from a positive level to a negative level at the center of the bit cell and a binary 0 may be represented by a change from a negative level to a positive level. If an electrical signal is produced having a direct correspondence to the recorded or received data pattern and if this electrical signal is compared with a reference signal, the electrical signal representing the binary information would be in phase or out of phase with the reference signal depending upon the binary information represented. In prior systems such as that disclosed in the above-identified patent application the proper phase of the reference signal is initially determined by generating a burst of zeros prior to the transmission of data to synchronize the clock. If during the transmission of data the synchronization of the clock is lost, it is not regained until a zero burst is again transmitted. The prior system therefore suffers from the drawback that valuable data time is lost during a zero burst and much data can be lost between zeros burst if the synchronization of the clock is not maintained.

It is accordingly a paramount object of the present invention to provide an improved binary data detection system which is capable of synchronizing itself without the necessity of a data burst.

It is also an object of this invention to provide a binary detection system which resynchronizes itself upon the data whenever synchronization is lost.

The above objects are accomplished in accordance with the invention by providing a circuit which integrates only positive excursions of data and another circuit which integrates only negative excursions of data. The first circuit integrates for a longer period of time and thus reaches a higher threshold when the data changes from a zero bit to a one bit. Likewise the negative data circuit integrates for a longer period of time and thus exceeds a threshold when the data changes from a one to a zero bit. When the first circuit exceeds its threshold it turns on a bistable device. When the second circuit reaches its threshold, it turns off the bistable device. Whenever the bistable device is on, ones are gated to the output. When the bistable device is off zeros are gated to the output.

The frequency of the data gate may be controlled by generating a reference voltage, the level of which varies with the frequency of the recorded data. This voltage is used to vary the time at which the bistable device is fired. In this manner the data gate can be made dependent upon the frequency of the recorded data.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figures 1, 2:
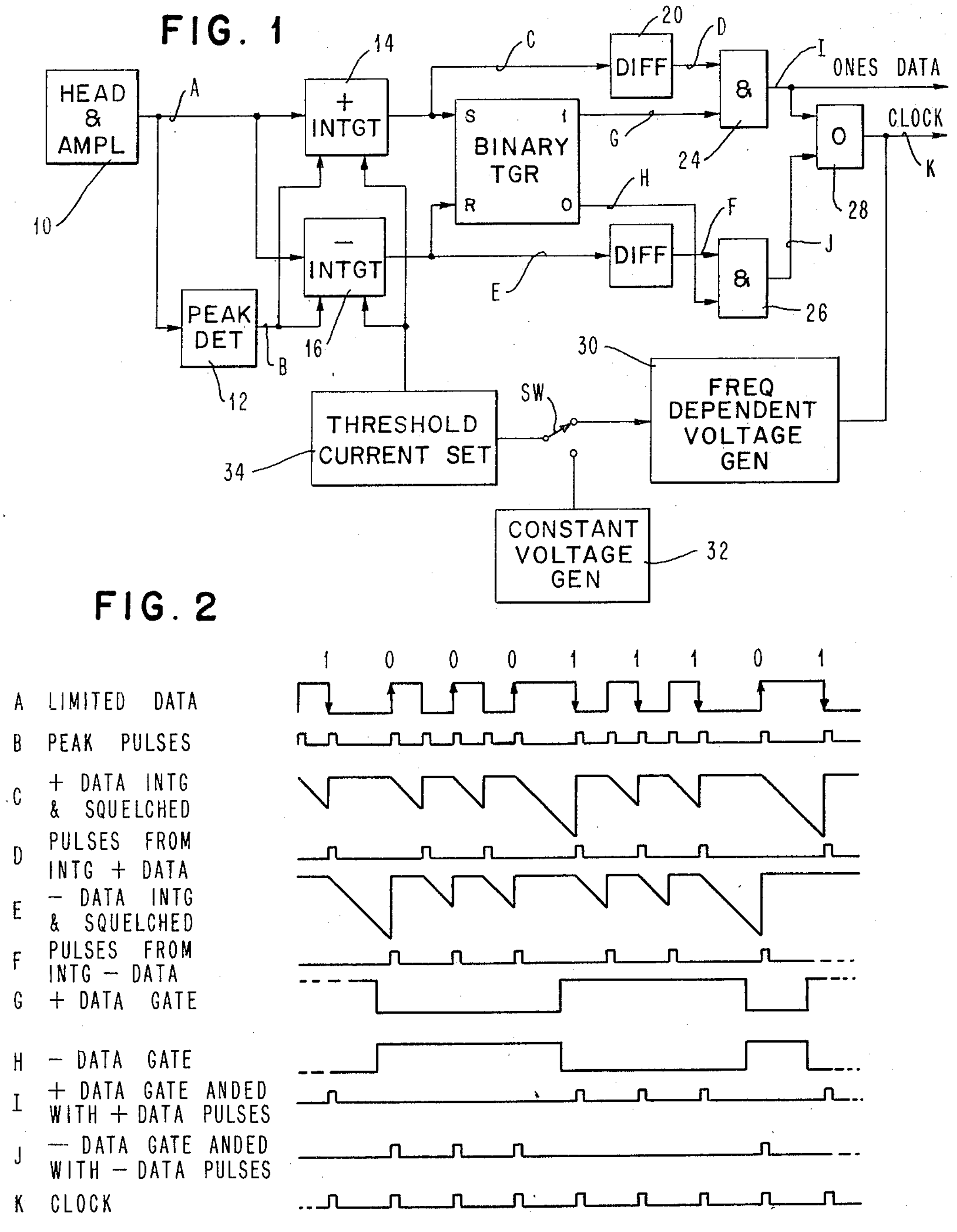
FIGURE 1 is a block diagram of a phase modulated binary detection system in which the invention is embodied.
FIGURE 2 is a timing chart illustrating voltage waveforms at indicated points in the circuit of FIGURE 1.

The circuit operation is first described with reference to FIGURE 1 and FIGURE 2. A head and amplifier 10 produces limited data which is phase modulated. As indicated by the arrows, a one is represented by a positive to negative shift, and a zero is represented by a negative to positive shift, occurring at data time. A peak detector 12 produces peak pulses (waveform B of FIGURE 2) occurring at positive and negative data transitions. The peak pulses and limited data A are fed to positive integrator circuit 14 and negative integrator circuit 16. The positive and negative integrators have their levels set by threshold current set circuit 34. The output of integrator 14 drives the set side of a bistable device such as a binary trigger which is set when the integration level exceeds a certain threshold. Likewise, the negative integrator 16 drives the reset side of the bistable device 18 to reset it whenever the negative level reaches a certain threshold. The integration process performed by the integrators 14 and 16 is squelched by peak detector 12 so that the positive integrator only integrates positive excursions of limited data and the negative integrator only integrates negative excursions of limited data. The trailing edge of the integrated pulses C and E at the outputs of integrators 14 and 16 are differentiated by differentiators 20 and 22 to provide pulses D and F occurring at data times in the cycle. The pulses D and F are ANDed at AND circuits 24 and 26 with respective outputs B and H from the 1 and 0 side of the binary trigger 18. The output of AND circuits 24 and 26 are ORed together at OR circuit 28 to provide a clock output K. The clock output K is fed back to a frequency dependent voltage generator 30 which may be connected to change the current delivered by the threshold current set 34 via switch SW. Alternatively, the switch SW may be connected to constant voltage generator 32 in which event the threshold current remains constant.

Referring now to FIGURE 2 the system operates as follows: The limited data is in the form shown by waveform A. All positive data excursions are integrated and then squelched as shown in waveform C by the peak pulses waveform B. Likewise, the negative data is integrated as shown at E and squelched by the pulses B. The integrated data C or E performs two functions: one is to set the bistable device 18 if the integration exceeds a certain threshold determined by threshold level set circuit 34, and the other function is to generate a pulse (waveform E or F) when the integration reaches a certain value and has been squelched. The integration C produces a long integration when the data changes from a zero to one and the integration E produces a long integration when the data changes from a one to a zero. In the first instance the integrated data turns on a bistable device and in the second instance it turns it off. The output from the bistable device is used as a positive data gate G or a negative gate H to gate ones or zeros, waveform E or F, to an output. By ANDing the ones data gate G and the plus data pulses D, ones data pulses I are generated. Similarly, zeros data pulses J are generated. ORing the pulses I and J together produces pulses K which occur at the data frequency and provide clocking pulses. Theoretically this detector can handle data frequency variations in the order of plus or minus 33 percent about the nominal frequency. With the addition of the frequency dependent generator 30 the range is extended to plus or minus 50 percent. The clock pulses in this instance are used to generate a voltage which is proportional to the frequency of the pulses.

This voltage is fed back within the circuit to change the integration time and thus the firing point of the bistable device 18.

To summarize this data detection system has the advantage that it has a high degree of noise immunity. The circuit is self-clocking and does not require an external clock. The circuit does not require a burst of one's or zero's to initialize the system in synchronization with the data. If data information is lost the system will resynchronize itself in phase with the data upon the recognition of a long wave length, that is, a change from a one to a zero or from a zero to a one.

Figure 3A:
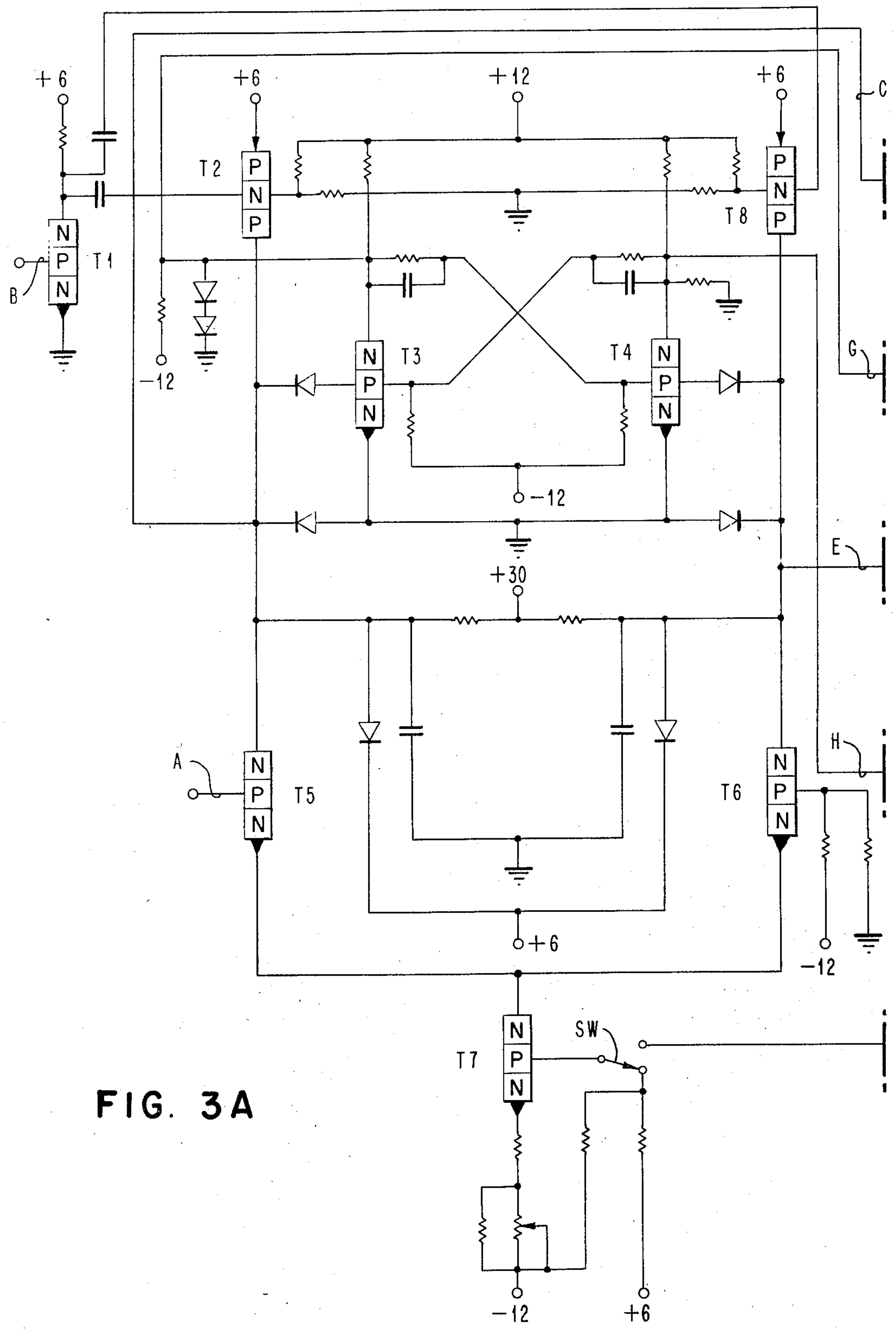
FIGURES 3A and 3B are schematic diagrams representing in more detail the logic shown in FIGURE 1.
Figure 3B:
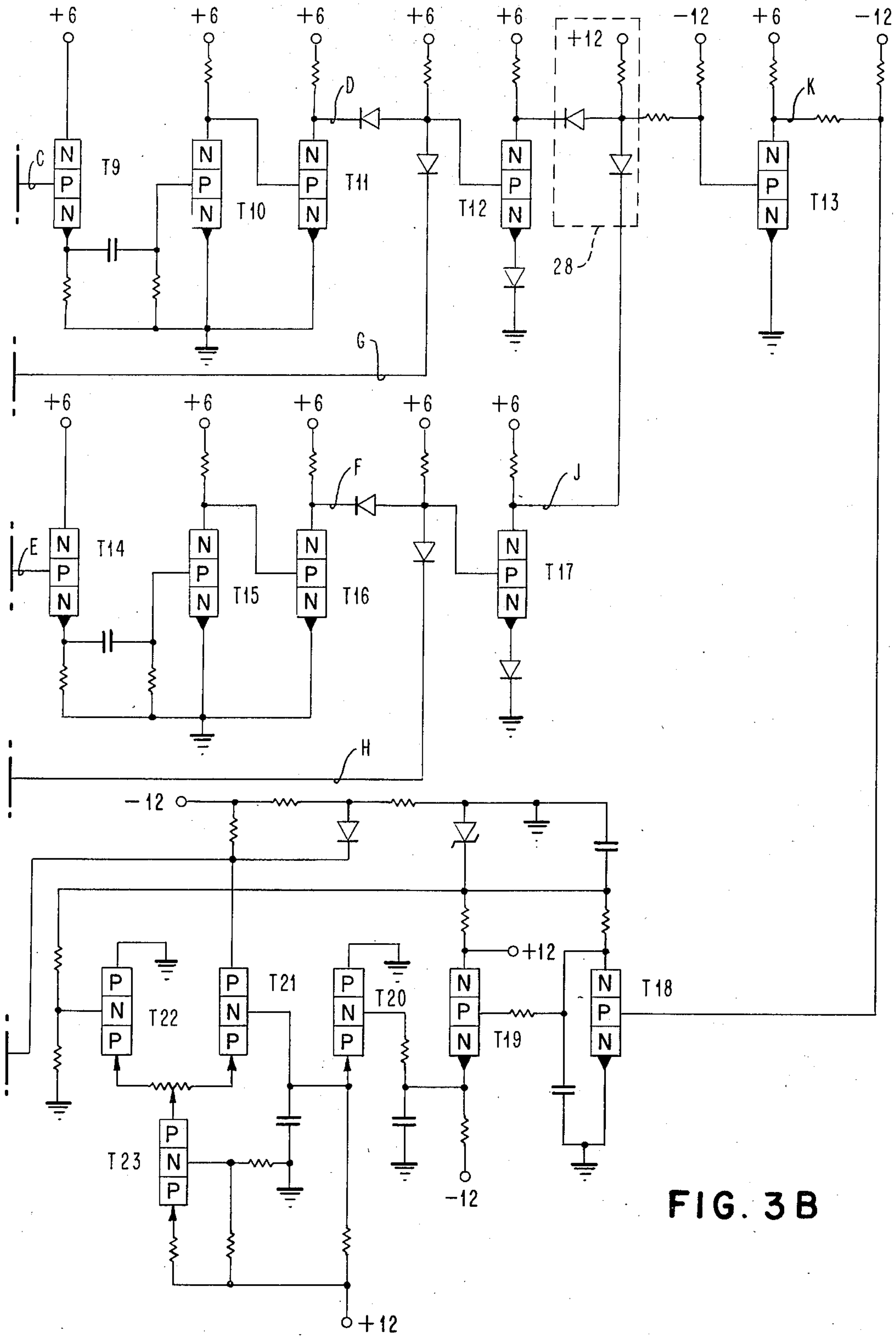

Detailed schematic diagrams of the circuit shown in FIG. 1 are shown in FIGS. 3A and 3B. The letters A throug K indicate points in the circuit at which the waveforms of FIG. 2 are taken. The peak pulse input transistor T1 drives integrator squelch transistors T2 and T8. The outputs of the integrators drive the set side and reset side of a bistable circuit T3, T4. The output of the integrator squelch transistor T2 drives an emitted follower T9 and the output of integrator squelch transistor T8 drives an emitter follower T14. The output of each of these emitter followers T9, T14 are differentiated and each drives respective inverters T10, T15. The transistors T11, T16 perform a second inversion and drive an AND circuit made up of diode inputs to transistors T12 and diode inputs to transistors T13. A second leg to the AND circuit of T12 is driven by the ON side of bistable circuit T3, T4. The second leg of the AND circuit comprising the diodes driving T13 is fed by the OFF side of the bistable circuit. The outputs of transistors T12, T13 are OR'd together in an OR circuit 28, the output of which drives transistor T13. The output of inverter T13 drives a frequency dependent voltage generator made up of transistors T18 through T23. The output of this frequency dependent voltage generator is fed through a switch SW which connects the input to transistor T7 (which performs a threshold current setting function) to either a constant voltage source or to the output of the quency dependent voltage generator.

While the invention has been particularly shown and described with reference to a preferred embodiment thereof, it will be understood by those skilled in the art that various changes in form and details may be made therein without departing from the spirit and scope of the invention.

What is claimed is:

1. A binary signal detection system for detecting binary signals from a data source which signals include regularly occurring data transitions, and in which a change from a one to a zero bit is manifested by a long wavelength of one polarity of the signal and a change from a zero to a one bit is manifested by a long wavelength of the opposite polarity signal, comprising:

a bistable device having a set input, a reset input, an on output, and an off output;

means connected between said data source and said set input for turning on said bistable device in response to long positive data manifestations;

means connected between said data source and said reset input for turning off said bistable device in response to long negative data manifestations;

means connected to said data source for generating pulses corresponding to changes from one polarity of said binary signal to the opposite polarity; and means for combining the on output of said bistable device with the generated pulses to thereby provide data output pulses corresponding to one binary valve.

2. The combination according to claim 1 including means connected to said data source for generating pulses corresponding to changes from the opposite polarity to said one polarity of said binary signal; and means for combining the off output of said bistable device with said second generated pulses to provide data output pulses of the opposite binary value to those provided by said first mentioned combining means.

3. The combination according to claim 2 including:

means for combining said data output pulses of said one and said opposite binary value to thereby provide regularly occurring clock pulses at each data transition time.

4. A binary signal detection system for detecting binary signals from a data source which signals include regularly occurring data transitions, and in which a change from a one to a zero bit is manifested by a long wavelength of a first polarity of the signal and a change from a zero to a one bit is manifested by a long wavelength of a second polarity of the signal, comprising:

first means connected to said data source for detecting the occurrence of a long signal wavelength of the first polarity;

second means connected to said data source for detecting the occurrence of a long signal wavelength of the second polarity; and storing means responsive to said first and second detecting means for registering and indicating by a first state the occurrence of said long signal wavelength of the first polarity and by a second state the occurrence of said long signal wavelength of the second polarity.

5. The combination according to claim 4 including:

means responsive to said data source for generating pulses corresponding to changes in said binary signal from said first polarity to said second polarity; and means for combining the indicated first state of said storing means and said generated pulses for generating data pulses of one binary value.

6. The combination according to claim 4 including:
means responsive to said data source for generating pulses corresponding to changes in said binary signal from said second polarity to said first polarity; and
means for combining the indicated second state of said storing means and said generated pulses for generating data pulses of a binary value opposite to that of said one binary value.

7. The combination according to claim 4 including:
means responsive to said data source for generating first pulses corresponding to changes in said binary signal from said first polarity to said second polarity;
means for combining the indicated first state of said storing means and said generated first pulses for generating data pulses of one binary value;
means responsive to said data source for generating second pulses corresponding to changes in said binary signal from said second polarity to said first polarity; and
means for combining the indicated second state of said storing means and said generated second pulses for generating data pulses of opposite binary value.

8. The combination according to claim 7 including:
means for combining the generated pulses of said one binary value with the generated pulses of said opposite binary value to produce clock pulses.

9. A binary signal detection system for detecting binary data signals from a data source which signals include regularly occurring data transitions, and in which a change from a one to a zero bit is manifested by a long wavelength of one polarity of the signal and a change from a zero to a one bit is manifested by a long wavelength of the opposite polarity signal, comprising:
first means connected to said data source for integrating positive excursions of the data signal to thereby produce a first integration signal;
second means connected to said data source for integrating negative excursions of the data signal to thereby produce a second integration signal;
a bistable device;
means responsive to said first means for turning on said bistable device when said first integration signal exceeds a threshold;
means responsive to said second means for turning off said bistable device when second integration signal exceeds a threshold; and
means for setting the integration time of said first and second means to correspond to long data signal wavelengths.

10. The combination according to claim 9 wherein said setting means includes means responsive to changes in the frequency of the regularly occurring data transitions to change the integration time in proportion thereto.

11. The combination according to claim 9 including:
means responsive to said first integration means for generating pulses when said first integration signal reaches a predetermined level; and
means for combining the indicated first state of said storing means and said generated pulses for generating data pulses of one binary value.

12. The combination according to claim 9 including:
means responsive to said second integration means for generating pulses when said second integration signal reaches a predetermined level; and
means for combining the indicated second state of said storing means and said generated pulses for generating data pulses of binary value opposite to said one binary value.

13. The combination according to claim 9 including:
means responsive to said first integration means for generating first pulses when said first integration signal reaches a predetermined level;
means for combining the indicated first state of said storing means and said generated first pulses for generating data pulses of one binary value;
means responsive to said second integration means for generating second pulses when said second integration signal reaches a predetermined level; and
means for combining the indicated second state of said storing means and said generated second pulses for generating data pulses of opposite binary value.

14. The combination according to claim 13 including:
means for combining the generated data pulses of said one binary value with the generated data pulses of said opposite binary value to produce clock pulses.

References Cited

UNITED STATES PATENTS

| | | | |
|---|---|---|---|
| 3,049,673 | 8/1962 | Barry | 329—104 |
| 3,401,346 | 9/1968 | Brown et al. | 329—104 |

ROY LAKE, Primary Examiner

L. J. DAHL, Assistant Examiner

U.S. Cl. X.R.

329—126

PO-1050
(5/69)

UNITED STATES PATENT OFFICE
CERTIFICATE OF CORRECTION

Patent No. 3,506,923 Dated April 14, 1970

Inventor(s) Louis E. Ambrico, Benjamin C. Fiorino

It is certified that error appears in the above-identified patent and that said Letters Patent are hereby corrected as shown below:

Column 4, line 35, the word "valve" should read --value--.
Column 5, line 48, after "when" insert the word --said--.
Column 6, line 20, after "of" insert the word --a--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents